Aug. 12, 1969  F. A. NELSON ET AL  3,461,381
PHASE SENSITIVE ANALOG FOURIER ANALYZER READOUT FOR
STORED IMPULSE RESONANCE SPECTRAL DATA
Filed June 14, 1968  2 Sheets-Sheet 1

INVENTORS
FORREST A. NELSON
RICHARD R. ERNST

BY
ATTORNEY

INVENTORS
FORREST A. NELSON
RICHARD R. ERNST

BY *[signature]*

ATTORNEY

United States Patent Office 3,461,381
Patented Aug. 12, 1969

3,461,381
PHASE SENSITIVE ANALOG FOURIER ANALYZER READOUT FOR STORED IMPULSE RESONANCE SPECTRAL DATA
Forrest A. Nelson, Santa Clara, Calif., and Richard R. Ernst, Winterthur, Switzerland, assignors to Varian Associates, Palo Alto, Calif., a corporation of California
Filed June 14, 1968, Ser. No. 737,213
Int. Cl. G01r 33/08
U.S. Cl. 324—0.5       7 Claims

ABSTRACT OF THE DISCLOSURE

A gyromagnetic resonance spectrometer and resonance data processing apparatus is disclosed. The gyromagnetic resonance spectrometer includes a pulsed radio frequency transmitter for applying a train of radio frequency impulses of energy to a sample under analysis to excite impulsed gyromagnetic resonance of the sample. The transient free precessional signals emanating from the resonance sample are received in a receiver, converted to an audio frequency spectrum, and stored in a memory. Successive resonance signals are added together in the memory to obtain a composite stored resonance signal having improved signal-to-noise ratio. In the memory successive Fourier components of each of the resonance impulse signals are not separated. A readout scanner scans the spectral data stored in the memory to obtain a time varying output containing a plurality of simultaneous Fourier resonance components. The time varying output signal is Fourier analyzed by repetitive comparison in a phase sensitive detector with the frequency of a frequency scanned reference signal to obtain an output signal corresponding to separate ones of the resonant Fourier components, if any, at the instantaneous frequency of the frequency scanned reference signal. A synchronizer synchronizes the phase of the reference frequency signal with the starting time of the repetitively scanned readout of the resonance data stored in the memory whereby the absorption and dispersion modes of the resonance components are separable by adjusting the phase difference between the reference frequency signal and the starting time of the repetitively scanned readout of the memory.

DESCRIPTION OF THE PRIOR ART

Heretofore, impulse type gyromagnetic resonance spectrometers have been built wherein a train of radio frequency pulses of energy have been provided for exciting a train of transient exponentially decaying resonance signals emanating from the sample under analysis. These transient resonance signals emanating from the sample have been successively sampled at predetermined intervals within each of the transient decaying resonance signals. The sampled resonance information was stored in separate channels of the memory of a computer. The resonance data derived from each successive transient resonant signal was added to the previously stored information for averaging out noise and improving the signal-to-noise ratio of the recorded spectral data. The composite resonance data signal stored in the separate channels of the memory of the computer contains a summation of the separate Fourier components of the resonance signal and in order to obtain a recorded output resonance spectrum of the sample under analysis, a mathematical Fourier transformation was made on the data in the computer. This typically involved a rather complex operation upon the stored data thereby requiring a relatively complex program and a relatively large computer. Such a spectrometer and data handling system is disclosed and claimed in copending U.S. application 459,006 filed May 26, 1965, and assigned to the same assignee as the present invention.

One of the problems associated with the prior art spectrometer and data handling system is that the computer for performing the Fourier transform on the stored data must be relatively large and complex. In many applications, the user does not have a computer sufficiently large to handle the data processing and therefore, the resonance data stored in the memory must be transferred to tape or punch cards and taken to a facility possessing a sufficiently large computer for processing data on the tape to produce a recorded output spectrum of the sample under analysis.

Therefore, a need exists for a simplified readout apparatus for Fourier analyzing the transient resonance data stored in the memory to produce an output spectrum of the sample under analysis for recording.

SUMMARY OF THE PRESENT INVENTION

The principal object of the present invention is the provision of an improved apparatus for Fourier analyzing and reading out stored impulse resonance spectral data.

One feature of the present invention is the provision of a Fourier analyzer for analyzing stored impulse resonance spectral data which includes, a readout scanner for repetitively scanning the stored spectral data to obtain a time varying output signal having a plurality of simultaneous Fourier components representative of the various resonance lines in the stored spectral data, a phase sensitive detector for comparing the output signal with a reference frequency, and a synchronizer for synchronizing the phase of the reference frequency signal with the starting time of the scan on the output of the stored spectral data, whereby either the pure absorption or pure dispersion modes of the separate Fourier components may be observed in the output of the phase sensitive detector.

Another feature of the present invention is the same as the preceding feature wherein the synchronizer generates a train of trigger pulses from the reference frequency signal for use in synchronizing the start of the scan of the output of the stored spectral data with the phase of the reference frequency signal.

Another feature of the present invention is the same as any one or more of the preceding features including a phase shifter for shifting the phase between the reference frequency signal and the starting time of the scan of the stored spectral data for observing either the absorption mode or the dispersion mode of the resonance signal.

Another feature of the present invention is the same as any one or more of the preceding features including the provision of a time delay for delaying one of the inputs to the phase sensitive detector relative to the other input to compensate for frequency dependent phase shifts between the two inputs.

Other features and advantages of the present invention will become apparent upon a perusal of the following specification taken in connection with the accompanying drawings wherein:

DESCRIPTION OF THE PREFERRED EMBODIMENTS

Figures 1, 2:
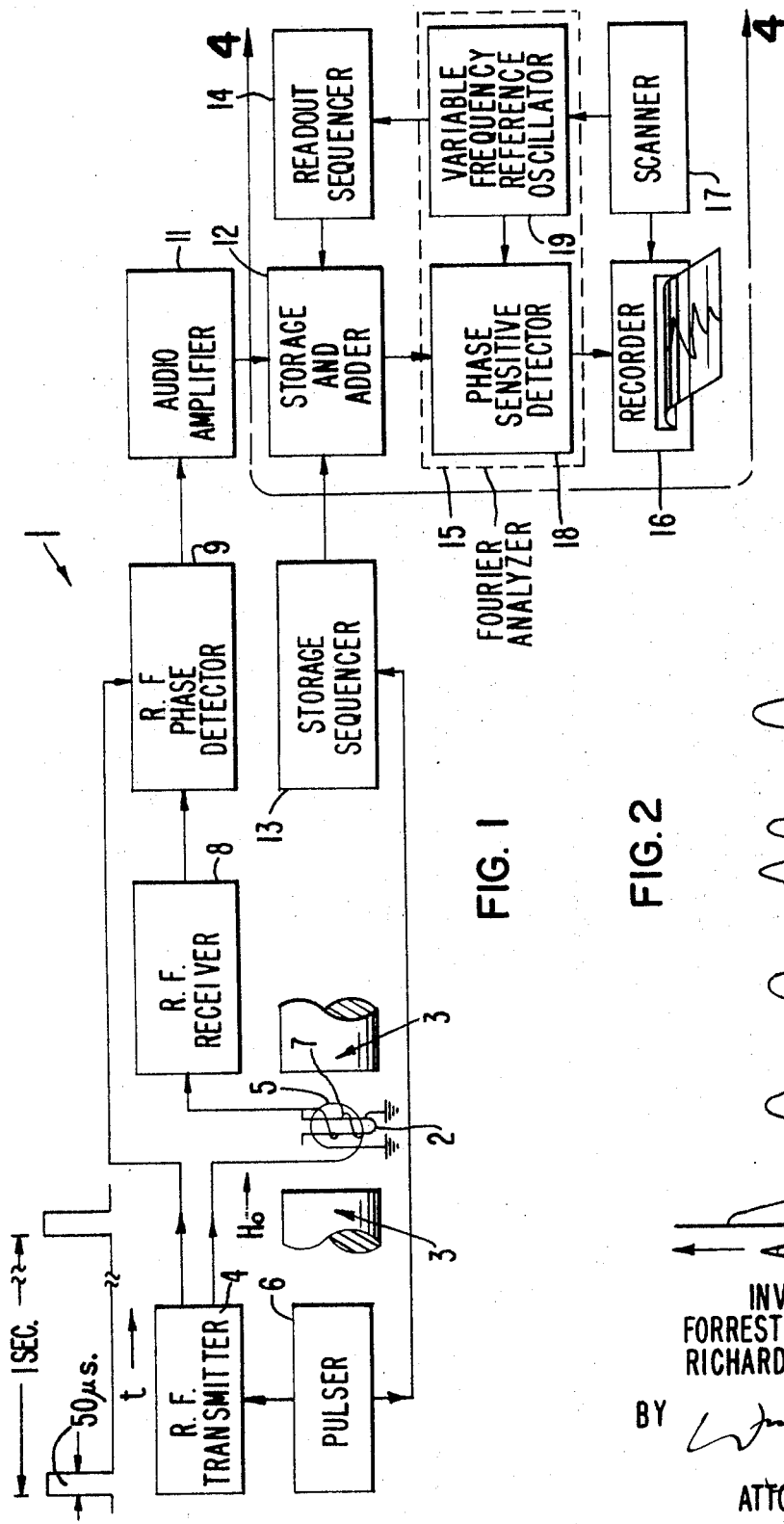
FIG. 1 is a schematic block diagram of a gyromagnetic resonance spectrometer system incorporating features of the present invention.
FIG. 2 is a plot of audio frequency resonance envelope amplitude versus time depicting sequential sampling times.

Referring now to FIG. 1, there is shown a gyromagnetic resonance spectrometer system 1 incorporating features of the present invention. The spectrometer 1 includes a sample of matter 2 disposed within a polarizing magnetic field $H_0$ produced between the poles of a magnet 3. A train of impulses of radio frequency energy, having a carrier frequency substantially at the gyromagnetic resonance frequency of the sample 2 within the polarizing magnetic field $H_0$ is applied to the sample 2 from a transmitter 4 for exciting simultaneous resonance of the various resonance lines within the sample to be observed. In a typical example, the radio frequency transmitter 4 will have a frequency as of 60 megahertz and will supply a train of radio frequency pulses to the sample 2 of 50 $\mu$s. duration with a pulse repetition frequency of 1 Hertz. The impulses of R.F. energy supplied from the transmitter 4 are applied to the sample 2 via radio frequency transmitter coil 5 oriented at right angles to the direction of the polarizing magnetic field $H_0$. A pulser 6 controls the pulse repetition rate and the pulse duration of the output of the R.F. transmitter.

Each pulse of radio frequency energy applied to the sample 2 excites a transient exponential decaying resonance signal. A pulse repetition frequency for the transmitter 4 is preferably sufficiently low such that the transient resonance signals emanating from the sample 2 die out to substantially zero amplitude between successive transmitter pulses to prevent carrying over of phase information from one resonance signal to the next. The transient resonance signals are picked up in a receiver coil 7 and fed to the input of a radio frequency receiver 8 wherein they are amplified and thence fed to one input of a radio frequency phase detector 9. The phase detector 9 compares the radio frequency resonance signals with a C.W. sample of the radio frequency transmitter signal to obtain a transient free precession audio frequency resonance signal which is fed to an audio amplifier 11 wherein it is amplified and fed to the input of a storage and adder 12.

The storage and adder 12 may comprise the memory of a digital computer together with suitable address circuits amplitude to time converters and logic, all of a type as disclosed in the aforesaid U.S. application 459,006. Alternatively, the storeg and adder may comprise an endless magnetic tape which stores the resonance data of one transient signal and then for the next successive resonance signal erases the first signal, adds it to the second signal and records the sum of the two signals and so on for many repetitive cycles. Such a storage and adding device is described in copending U.S. application 491,190 filed Sept. 29, 1965, now U.S. Patent 3,440,631 issued April 22, 1969.

A storage sequencer 13 is synchronized from pulser 6 and controls the storage cycle within the storage and adder 12 such that corresponding portions of sequentially obtained transient signals are added together and stored in the storage and adder 12. More particularly, for the case of a binary digital memory, the storage sequencer causes each successive transient resonance signal, one of which is indicated in FIG. 2, to be sampled at the same time intervals, namely, at times $t_1$, $t_2$, $t_3$ . . . $t_n$ from a zero starting time $t_0$ for each transient resonance signal. Assuming resonance conditions have not changed over the sample between successive transient resonance signals, such signals will be identical except for random noise fluctuations. Thus, the storage sequencer 13 causes a resonance signal to be sampled at the same place in each successive signal and each of the sampled amplitudes are converted into binary information and added together in a respective channel of the memory. The signal will add according to the number of successive resonance signals, whereas the noise, due to its random nature, will add only according to the square root of the number of successive resonance signals; thus a substantial improvement in signal-to-noise ratio is obtained by adding together successive resonance signals.

In the case of the endless magnetic tape storage and adder, successive resonance envelope signals derived from the audio amplifier 11, are recorded on the endless tape. More particularly, a pickup head picks up the previously stored resonance information and adds to it the next successive resonance signal and records the total resonance signal on the tape. The storage sequencer 13, which may derive its sequencing signals from the signal recorded on the tape, feeds a signal back to control the pulse repetition rate and the timing of the R.F. pulses to cause corresponding portions of successive resonance signals to be synchronized with the previously recorded composite resonance signal. The resonance spectral data recorded in the storage and adder 12 corresponds to a summation of the series of separate resonance envelope signals of the type shown in FIG. 2. Such a resonance signal includes all of the separate simultaneously excited Fourier components produced by the separate resonant lines of the sample under analysis. Such a composite resonance signal contains all the useful resonance spectral information but not in a form susceptible of analysis by an operator until the separate Fourier components of the composite resonance signal are separated for analysis.

Accordingly, after storage a readout sequencer 14 repetitively feeds an input into the storage and adder, causing the storage and adder 12 to produce a train of time-varying output signals similar to that of FIG. 2 and each containing the unseparated simultaneous Fourier components representative of the various simultaneous resonance lines in the stored spectral data. The time-varying output signal from the storage and adder 12 is fed to a Fourier analyzer 15 indicated by the dotted lines. The output of the Fourier analyzer 15 is an output spectrum signal which is fed to one input of a recorder 16 for recording as a function of a scanner signal obtained from scanner 17 to produce a recorded output spectrum of the sample under analysis.

The Fourier analyzer 15 is more fully disclosed below with regard to FIG. 4 but briefly includes a phase sensitive detector 18 for comparing the phase of the read out composite time-varying output signal with a variable frequency reference signal derived from reference oscillator 19 to obtain sequential D.C. resonance output signals as the instantaneous frequency of the reference oscillator is scanned through a Fourier resonance component in the time-varying output signal as derived from the storage and added 12. In other words, the scanner 17 scans the frequency of the variable frequency reference oscillator 19 such that the separate Fourier resonance components within the output signal are Fourier analyzed and sequentially detected to produce the output resonance spectrum which is recorded on recorder 16.

In order to separate the absorption resonance mode of the sample under analysis from its dispersion resonance mode, it is necessary to obtain certain fixed phase relations between the Fourier components in the time-varying output signal derived from the store and adder 12 and the phase of the signal derived from the reference oscillator 19. This phase relation is obtained by synchronizing the phase of the reference oscillator 19 with the starting time of each readout cycle.

Figure 3:
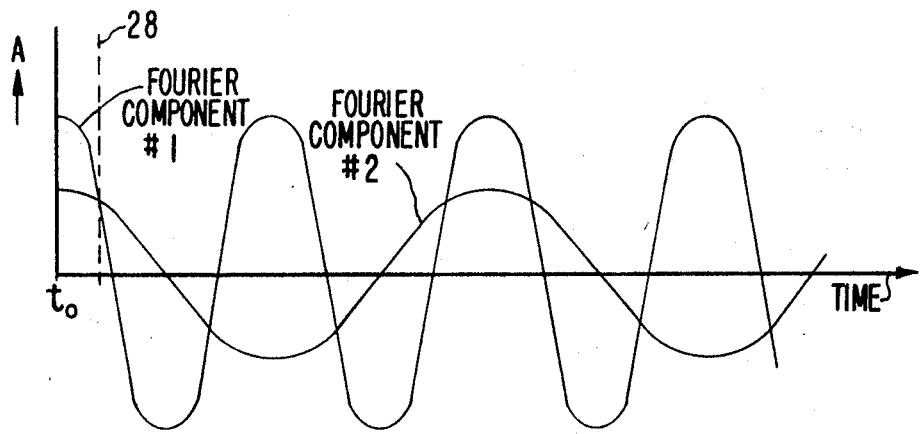
FIG. 3 is a plot of signal amplitude versus time depicting two Fourier components of the composite resonance envelope signal of FIG. 2.

Referring now to FIGS. 2 and 3, the time-varying output of the storage and adder 12 has an envelope such as shown in FIG. 2. The envelope signal of FIG. 2 has at least two separate Fourier components, as indicated schematically in FIG. 3. Normally, at time $t_0$, each of the Fourier components has the same phase. Thus, when the phase of the reference oscillator 19 is synchronized with the starting time $t_0$ for each successive frequency of the variable reference frequency oscillator 19 the phase information will be preserved in the output resonance spectrum. By adjusting the phase relation between the reference oscillator and the starting time $t_0$ of the scan of the storage and adder 12, either the absorption or dispersive mode of the resonance spectrum may be detected and recorder by recorder 16 depending upon the phase difference between these two signals.

Figure 4:
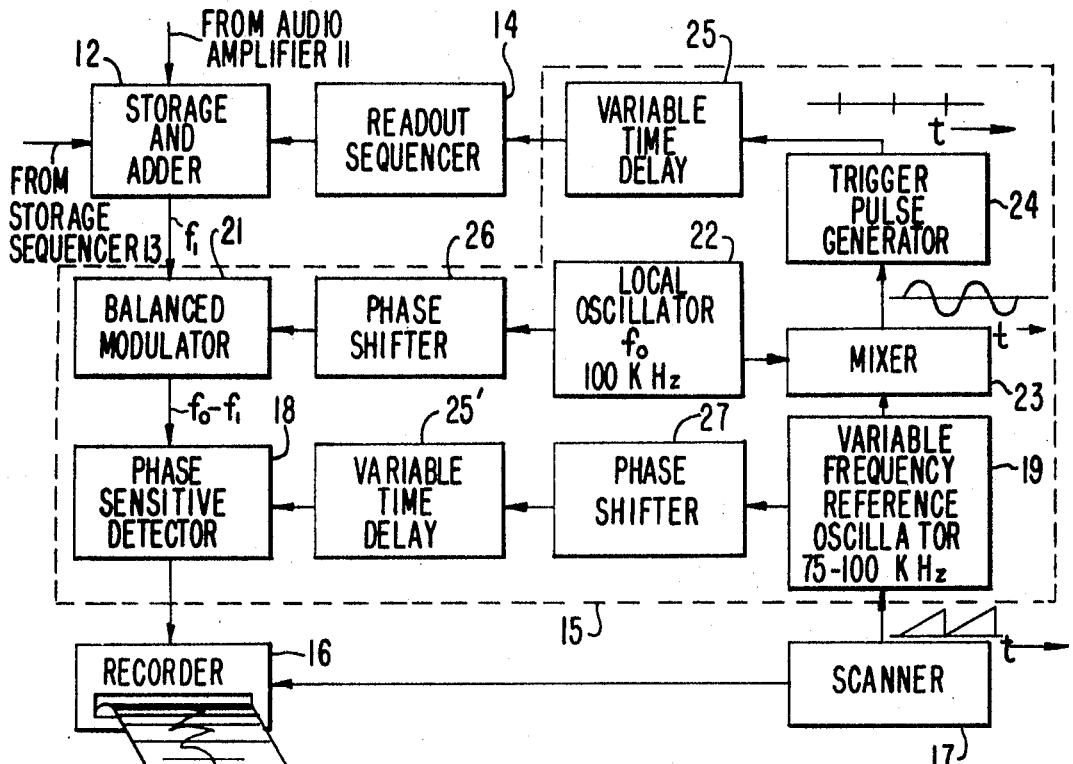
FIG. 4 is a more detailed schematic block diagram of a portion of the structure of FIG. 1 delineated by line 4—4.

Referring now to FIG. 4, the readout circuits and Fourier analyzer 15 will be more fully disclosed. The resonance spectral data stored in the storage and adder 12 is sequentially and repetitively read out via a signal fed to the storage and adder 12 from the readout sequencer 14. The output of the storage and adder 12 comprises a repetitive time sequence of time-varying output signals having the general form indicated in FIG. 2. The frequency of the Fourier components contained within the time-varying output signal of the storage and adder 12 will vary in proportion to the rate at which storage and adder 12 is read out. Typically, it is contemplated that these Fourier components will be in the audio frequency range.

The audio Fourier components may be transformed directly but to overcome some practical problems, i.e., in order to reduce the relative frequency range of the readout phase detector, the audio components are translated to a higher frequency range. More specifically, the audio frequency components indicated by $f_1$ are fed to one input of a balanced modulator 21 wherein they are heterodyned with a local oscillator signal $f_0$ at, for example, 100 kilohertz for translating the audio Fourier components in the output of the storage and adder to a higher frequency range corresponding to one of the sidebands of the local oscillator signal produced in the output of the balanced modulator 21. The lower sideband signal indicated by $(f_0-f_1)$ is selected by a suitable filter, not shown, and fed to one input of the phase sensitive detector 18. The output of the variable frequency reference oscillator 19 which may comprise frequencies from 75 to 100 kilohertz to cover the expected sideband spectrum is fed to the other input of the phase sensitive detector 18.

A sample of the variable frequency reference oscillator frequency is fed to one input of a mixer 23 wherein it is mixed with a sample of the local oscillator signal $f_0$ to derive a lower audio frequency beat signal in the frequency range of $f_1$ which is variable in accordance with variations in the frequency of the reference oscillator 19. The low audio variable frequency signal is fed to an input of a trigger pulse generator 24 which differentiates and shapes the audio frequency signal to derive a train of trigger pulses having a repetition frequency and phase correspondoing to the audio frequency output of the mixer 23.

The trigger pulse output of pulse generator 24 is fed via a variable time delay 25, such as variable delay multivibrator circuit, to the input of the readout sequencer 14 for controlling the starting time of each readout sequency of the storage and adder 12. More particularly, upon termination of each readout scan of the storage and adder 12 a new scan will not be started until the occurrence of the next trigger pulse derived from the output of trigger pulse generator 24. In this manner, the starting time $t_0$ for each time-varying output signal of the storage and adder 12 is synchronized with the phase of an audio signal derived from the variable frequency reference oscillator 19.

A variable phase shifter 26 is provided between the local oscillator 22 and the balance modulator 21 for shifting the phase of $f_0$ to adjust the phase difference between the time-varying input signal $(f_0-f_1)$ to the phase-sensitive detector 18 and the phase of the variable frequency reference signal derived from reference oscillator 19 such that either the pure absorption or pure dispersion mode of the Fourier resonance components in the composite resonance signal may be separately observed. Alternatively, the phase shifter 26 may have been incorporated between the phase sensitive detector 18 and the variable frequency reference oscillator 19 for varying the phase of the reference signal fed to the phase sensitive detector 18. As another alternative the phase shifter 26 may be incorporated between the output of the storage and adder 12 and the input to the balanced modulator. However, it is preferred to place the phase shifter 26 between the local oscillator 22 and the balanced modulator 21 since in this position the phase shifter always operates at a fixed frequency; therefore, the design of the phase shifter 26 is simplified.

When the frequency of the reference oscillator 19 corresponds to the frequency of one of the Fourier resonance components within the signal $(f_0-f_1)$ as fed from the balance modulator 21 to the phase sensitive detector 18, a D.C. resonance output signal corresponding to that spectral line of the sample under analysis will be obtained in the output of the phase sensitive detector 18 and fed to the recorder 16 for recording as a function of the scan signal derived from scanner 17. In any practical spectrometer apparatus, unavoidable time delays are likely to be encountered in processing the signal information within the system. These unavoidable time delays can produce a frequency dependent phase shift of the various resonance Fourier components; for example, a dotted vertical line 28 of FIG. 3, corresponding to a given time delay, produces a substantially different phase shift for the Fourier component number 1 as compared to the Fourier component number 2, where such components have substantially different frequencies.

In addition, the spectrometer circuitry may introduce frequency dependent phase shifts which can be certain complex and arbitrary functions of frequency. Both the linear and complex kinds of frequency dependent phase shifts between the read out input signals to the above sensitive detector 18 and the reference signal input to the phase sensitive detector 18 can be eliminated by providing a corrective phase shift in one or both of the two input channels to the phase sensitive detector 18. For example, the variable time delay 25 disposed between the reference frequency oscillator 19 and the readout sequencer 14 serves to provide a linear type corrective frequency dependent phase shift in the read out input channel to the phase sensitive detector 18. Likewise, the variable time delay 25' such as a delay line is provided in the reference frequency input channel to the phase sensitive detector 18 to introduce a linear frequency dependent phase shift correction. In addition, corrective frequency dependent phase shifts, which can be predetermined arbitrary functions of frequency, can be introduced by a computer operated phase shifter 27 disposed in the reference frequency input channel of the phase sensitive detector 18. The computer can be very simple such as a cam having the proper predetermined profile and operated from a tuner drive shaft output of the variable frequency reference oscillator 19. Alternatively, the computer may operate the phase shifter 26 to introduce the corrective frequency dependent phase shift into the read out input channel to the phase sensitive detector 18.

The variable time delays 25 and 25' and the phase shifters 26 and 27 provide means for adjusting the relative phase relation between the phase of the reference signal derived from reference oscillator 19 and the starting time $t_0$ or phase of the read out signal and, thus, provides means for eliminating the undesired frequency dependent phase shifts in the system which are occasioned by the unavoidable time delays and phase shifts therein. Thus, the phase shifters 26 or 27 and or time delays 25 and 25' may be set for either the absorption or dispersion mode to produce dispersion or absorption mode output of the phase sensitive detector 18 over the entire spectrum of the sample under analysis.

In the system of the present invention, the readout sequencer 14 and the scanner 17 may be set to read out and to scan at a much faster rate than that at which the original information was stored in the storage and adder 12. Provision of the local oscillator 22 for translating to the time-varying output signal of the storage and adder to the higher frequency range facilitates more rapid scanning and sequencing of the information stored in the storage and adder 12. This results because the required bandwidth to accommodate this information is more easily obtained at the higher frequency range. However in some applications such as electron spin resonance, ESR or nuclear quadrupole resonance, NQR it may be desireable to translate the stored frequency to a lower frequency range in which case the scan rate is decreased compared to the stored rate.

The phase sensitive Fourier analyzer method and apparatus as above described is applicable in general to Fourier analysis of stored impulse resonance spectral data and is not specifically limited to analysis of gyromagnetic resonance data. More specifically, this method and apparatus is applicable to analysis of resonance spectral data obtained from nuclear magnetic resonance electron spin resonance, nuclear quadrupole resonance, magnetic resonance in ferromagnetic materials, magnetic resonance in molecular beams, electric resonance in molecular beams, and ion cyclotron resonance. Thus the spectrometer need not employ a magnet, for example.

Since many changes could be made in the above construction and many apparently widely different embodiments could be made without departing from the scope thereof, it is intended that all matter contained in the above description or shown in the accompanying drawings shall be interpreted as illustrative and not in a limiting sense.

What is claimed is:

1. In an apparatus for storing and reading out impulse resonance spectral data, means for storing impulse resonance spectral data containing a plurality of simultaneous Fourier resonance components, means for scanning the stored spectral data to obtain a time-varying output signal having a plurality of simultaneous Fourier components representative of the various simultaneous resonance lines in the stored spectral data, means for deriving a signal having a certain reference frequency, means forming a phase-sensitive detector for comparing the phase of the reference frequency signal with the time-varying output signal of the stored spectral data to obtain an output signal corresponding to one of the resonance Fourier components, if any, at the reference frequency, THE IMPROVEMENT COMPRISING, means for synchronizing the phase of the reference frequency signal with the starting time of the scan of the stored spectral data, whereby the absorption and dispersion mode resonance components of the separated resonance Fourier components are separable by adjusting the phase difference between the synchronized reference frequency signal and the starting time of the scan.

2. The apparatus of claim 1 including means for scanning the frequency of the reference frequency to obtain an output resonance spectrum.

3. The apparatus of claim 1 wherein said means for synchronizing the scan of the stored spectral data with the phase of the reference frequency includes, means for deriving a train of trigger pulses from the reference frequency signal, and means for applying the trigger pulses to said means for scanning the stored spectral data to synchronize the start of the scan with the timing of one of the trigger pulses.

4. The apparatus of claim 1 including means for shifting the phase difference between the reference frequency signal and the starting time of the scan of the stored spectral data for observing either the absorption mode signal or the dispersion mode signal according to the adjustment of said phase shifting means.

5. The apparatus of claim 1 including a time delay means for delaying one of the inputs to said phase sensitive detecting means relative to the other input to said phase sensitive detecting means to compensate for frequency dependent phase shifts between the two inputs.

6. The apparatus of claim 1 including means for heterodyning the scanned output signal of said storage means with a second reference frequency to translate the output signal to a different frequency range for comparison with the first reference frequency in said phase sensitive detecting means.

7. The apparatus of claim 1 including means for applying a train of pulses of radio frequency energy to a gyromagnetic resonance sample in a polarizing magnetic field to excite impulse gyromagnetic resonance of the sample, means for receiving the train of resonance signals emanating from the resonated sample, and means for adding together the successively received resonance signals and storing the corresponding totals in said resonance data storing means.

References Cited

UNITED STATES PATENTS

| | | | |
|---|---|---|---|
| 3,075,156 | 1/1963 | Anderson | 324—0.5 |
| 3,137,813 | 6/1964 | Kroon | 324—0.5 |
| 3,209,242 | 9/1965 | Bell | 324—0.5 |
| 3,376,499 | 4/1968 | Freeman | 324—0.5 |

TERRELL W. FEARS, Primary Examiner

H. BERNSTEIN, Assistant Examiner

U.S. Cl. X.R.

340—173